(12) United States Patent  (10) Patent No.: US 6,459,522 B2
Yariv  (45) Date of Patent: *Oct. 1, 2002

(54) TIME-INTERLEAVED OPTICAL PULSES FOR SIGNAL PROCESSING (75) Inventor: Amnon Yariv, San Mareno, CA (US)

(73) Assignee: California Institute of Technology, Pasadena, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/837,795

(22) Filed: Apr. 17, 2001

Related U.S. Application Data (63) Continuation of application No. 09/193,551, filed on Nov. 17, 1998, now Pat. No. 6,219,172.
(60) Provisional application No. 60/065,249, filed on Nov. 18, 1997.

(51) Int. Cl.[7] ................................................. G02F 1/03
(52) U.S. Cl. .................. 359/264; 359/188; 359/181
(58) Field of Search .................................. 359/264, 245, 359/188, 184, 181

(56) References Cited

U.S. PATENT DOCUMENTS

| 5,555,119 | A |   | 9/1996  | Lewis           |         |
|-----------|---|---|---------|-----------------|---------|
| 5,822,103 | A | * | 10/1998 | Boroson         | 359/184 |
| 5,889,607 | A |   | 3/1999  | Suzuki et al.   |         |
| 6,028,424 | A | * | 2/2000  | Twichell et al. | 324/96  |
| 6,219,172 | B1| * | 4/2001  | Yariv           | 359/264 |

* cited by examiner

Primary Examiner—Huy Mai
Assistant Examiner—Tuyen Tra
(74) Attorney, Agent, or Firm—Fish & Richardson P.C.

(57) ABSTRACT

Devices and techniques for processing an analog signal by using optical pulses at a high sampling rate. Parallel analog-to-digital conversion channels can be implemented to achieve high-speed analog-to-digital conversion.

23 Claims, 10 Drawing Sheets

TIME-INTERLEAVED OPTICAL PULSES FOR SIGNAL PROCESSING

This application is a continuation application of U.S. patent application Ser. No. 09/193,551, filed Nov. 17, 1998 and issued as U.S. Pat. No. 6,219,172 on Apr. 17, 2001, which claims the benefit of U.S. Provisional Application No. 60/065,249, entitled "Time Interleaved Sampling by Optical Techniques and Its Application to Ultra High Speed A/D conversion" and filed Nov. 18, 1997.

TECHNICAL FIELD

The present invention relates to sampling and processing of analog signals, more specifically, to analog-to-digital conversion using optical techniques.

BACKGROUND

Analog electronic signals can be represented or reconstructed by a certain set of discrete sampled values or samples. Many electronic applications use samples of analog signals instead of the analog signals. For example, digital data processing and communication systems use digital data converted from samples of an analog signal to achieve improved noise immunity and processing flexibility in data processing and transmission. Conversion of analog signals to digital data can be accomplished by first sampling the analog signals into sampled values and then digitizing the sampled values in a desired form.

A sampling rate or sampling frequency describes the number of samples taken from an analog signal per unit time (e.g., one second). The minimum sampling rate should be equal to or greater than the Nyquist rate, which is double the highest frequency in an analog signal, in order to preserve the minimum information content in the original analog signal. Thus, a high sampling rate is desirable in converting an analog signal with signal components at high frequencies into digital form. In addition, an analog signal may be oversampled at a sampling rate much higher than the Nyquist rate to improve the signal-to-noise ratio and/or precision of a subsequent analog-to-digital conversion.

Sampling of analog electronic signals is usually accomplished electronically by using electronic circuits. Electronic sampling techniques and circuits are well developed. The maximum sampling rate achievable by an electronic circuit is generally limited by the response times of the electronic components and the circuit configuration. This further limits the conversion speeds of many electronic analog-to-digital converters.

Such speed limitation in electronic digital-to-analog conversion can be an obstacle to many applications that require high-speed analog-to-digital conversion. Real-time digital video in applications such as telecommunication and machine vision is one such example. The performance of the real-time digital video in the existing video delivery on the Internet and in video conferencing systems is not only limited by the bandwidth limitation in the data transmission channels but also limited by the analog-to-digital conversion rates.

SUMMARY

Therefore, there exists a need for devices and techniques that provide high-speed sampling and analog-to-digital conversion.

The present disclosure includes devices and techniques for sampling analog signals at high sampling rates by using optical pulses in a special way. It further provides devices and techniques for converting such high-rate samples into digital data.

One aspect of the disclosure describes generation of a train of dense pulses comprising a sequence of pulses that have different pulse signatures so that one pulse is distinguishable from adjacent pulses and different pulses with a common pulse signature can be separated from other pulses to form a new pulse train. The pulses are "dense" in a sense that the pulse repetition rate is higher than the upper switching rate of many electronic devices.

One example of such dense pulse trains may include a sequence of pulses that are centered at different wavelengths. One device for generating this pulse train includes a mode-locked laser for producing optical pulses with a known pulse repetition period, a plurality of optical demultiplexer (e.g., "drop" filters) connected in series and each configured to separate adjacent oscillation modes in each pulse near a different center wavelength and to transmit remaining modes in each pulse such that each demultiplexer produces a train of pulses of the same pulse repetition period at a different center wavelength, and a plurality of optical multiplexers (e.g., "add" filters) connected in series to form an optical path and configured to respectively couple the plurality of pulse trains at different center wavelengths to the optical path with a delay relative to one another so as to form an interleaved dense pulse train. This interleaved dense pulse train has a shortened pulse repetition period and a sequence of pulses at different center wavelengths within one pulse repetition period of the mode-locked laser.

Another device for generating the above interleaved dense pulse train comprises a plurality of mode-locked lasers respectively producing optical pulses at different center wavelengths with the same pulse repetition period, and a plurality of optical multiplexers (e.g., "add" filters) connected in series to form an optical path and configured to respectively couple the plurality of pulse trains from the mode-locked lasers to the optical path to form the interleaved pulse train.

A second aspect of the disclosure includes sampling an analog signal by using the above train of dense pulses. An optical modulate is used to modulate a property of the pulses in the interleaved dense pulse train in response to an analog signal and therefore impose the information in the analog signal onto the optical pulses. The analog signal may be in various forms such as an electrical analog signal that drives the optical modulator or an optical analog signal that interacts with the optical pulses to produce the modulation (e.g., a wave-mixing device). The property of the pulses may be the amplitude, phase, polarization, or other parameters of the optical pulses. One simple implementation is amplitude modulation by using an optical amplitude modulator that is driven by an analog electrical signal. This converts the information in the analog signal into amplitude variation of the dense pulses at a sampling rate equal to the repetition rate of the dense pulses.

A third aspect of the disclosure involves separating the information-bearing dense pulse train into a plurality of pulse trains according to their pulse signatures. In the above wavelength interleaved pulse train, pulses at different center wavelengths are separated into different pulse trains each with the same center pulse wavelength. Each pulse train has less pulses per unit time than the original pulse train. Hence, the pulse repetition rate is reduced to the low pulse repetition rate of the original unmodulated pulse trains. One or more optical demultiplexers, such as a set of optical "drop" filters respectively corresponding to the different center wavelengths, may be connected in series in the optical path of the dense pulse train to perform the pulse separation and to generate a plurality of parallel signal channels at different center wavelengths and different time delays. Each signal channel may further include a photosensor for converting the modulated optical pulses into analog electrical pulses, and an electronic analog-to-digital converter for converting the analog pulses into digital data. The reduced pulse repetition rate of the pulse trains in the signal channels can be set to accommodate for the processing speed of the electronic analog-to-digital converters. The analog-to-digital conversion of all signal channels is performed electronically in parallel. The combined digital data from all signal channels includes all the information content of the analog signal if the repetition rate of the dense pulse train is equal to or greater than the Nyquist rate of the analog signal and hence can be used for subsequent digital signal processing.

One advantage of the systems in the disclosure is their unique optical sampling by dense pulses to achieve desired high sampling rates. A train of dense pulses comprising a sequence of a plurality of pulses at different center wavelengths can be formed to have a high pulse repetition frequency that is in general difficult, if not possible to achieve with electronic sampling devices. An increase in the sampling rate by a factor up to and or greater than $10^2$ may be achieved.

Another advantage is an increased speed in analog-to-digital conversion. This is at least in part due to the optical processing in sampling and separating the modulated dense pulse train into multiple pulse trains at different center wavelengths and in part due to the parallel analog-to-digital conversion in the multiple signal channels.

These and other aspects and advantages will become more apparent in light of the accompanying drawings, the detailed description, and the claims.

DETAILED DESCRIPTION

Signal sampling is conventionally achieved by using electronic pulses that are usually effected by electronic switches or modulators. The repetition rate of the electronic pulses is the sampling rate.

An optical pulse train is not subject to many of the physical barriers that limit electrical signals, e.g., line capacitance and resistance. Hence, an optical signal in general can have a repetition rate much higher than what is possible for an electronic pulse train and can have sharp pulse edges. An optical pulse train can be modulated by using an analog signal, which may be electrical, optical or of other forms, to drive an optical modulator. The modulated pulses then become samples of the analog signal in the optical domain. A higher sampling rate, which may not be possible by electronic sampling techniques, can therefore be achieved.

However, such optical samples may not be easily converted into electronic pulses for further electronic processing since the repetition rate of the optical pulses can be too high for electronic circuits to respond or detect.

This difficulty can be overcome by using a plurality of parallel electronic channels to process the data contained in an optical pulse train. Each electronic channel is designated to process only a fraction of the data carried in the optical pulse train. An opto-electronic signal processing device can be implemented to combine the above high-speed optical sampling and parallel electronic processing to achieve sampling rates and processing speeds higher than the state of art electronic circuits.

Figure 1:
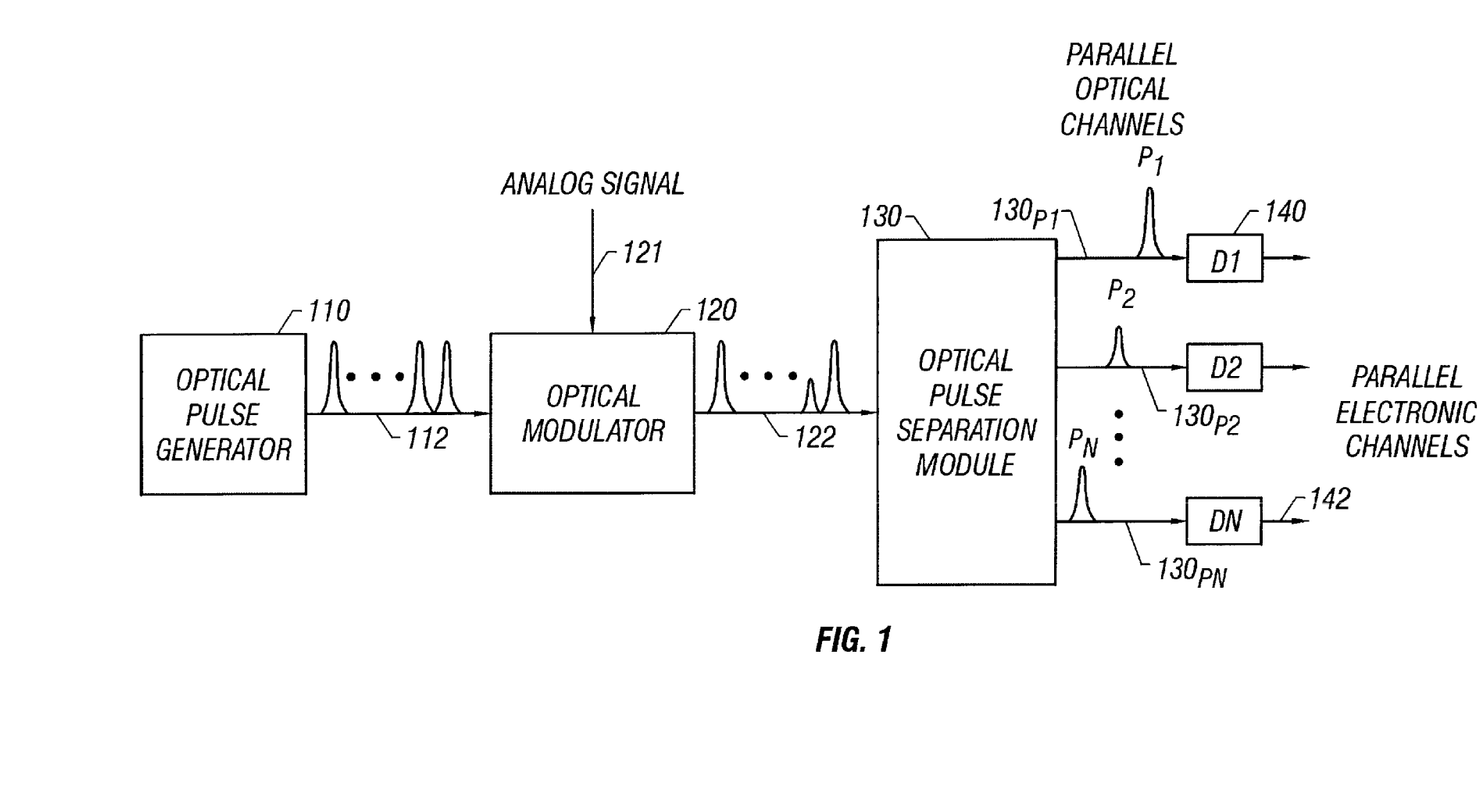
FIG. 1 is a diagram of a signal sampling device based on optical pulses with a high repetition rate.

FIG. 1 shows an embodiment of an opto-electronic device 100 that is based on the high-speed optical sampling and parallel electronic processing. An analog electronic signal 121 is to be sampled and may be converted into digital form. An optical pulse generator 110 produces an optical pulse train 112 with a high repetition rate, $f_s$. An optical modulator 120, e.g., an electro-optical modulator, responds to the analog electronic signal 121 to modulate the optical pulses in the optical train 112 and hence produces a modulated optical train 122. A property of an optical pulse, e.g., phase or amplitude, is modulated to encode the information of the analog signal 121 onto the optical pulse to represent a sample of the analog signal 121.

An optical pulse separation module 130 separates the modulated optical pulse train 122 into a plurality of pulse trains $132P_1$, $132P_2$, ..., $132P_N$ (e.g., N number of pulse trains) each having a common reduced repetition rate of $f_s/N$. A series of N sequential pulses (indicated by $P_1$, $P_1$, $P_2$, ..., and $P_N$) in the modulated optical pulse train 122 are separated into the pulse trains $132P_1$, $132P_2$, ..., $132P_N$, respectively. Hence, the first pulse train $132P_1$ has pulses $P_1$, $P_{1+N}$, $P_{1+2N}$, and so on; the second pulse train $132P_2$ has pulses $P_2$, $P_{2+N}$, $P_{2+2N}$, and so on; and the last pulse train $132P_N$ has pulses $P_N$, $P_{2N}$, $P_{3N}$, and so on. The separated pulse trains $132P_1$, $132P_2$, ..., $132P_N$ are then routed to N parallel optical detectors 140 ($D_1$, $D_2$, ..., and $D_N$) and are converted into N parallel electronic channels 142.

One way to implement above pulse separation is to generate the dense pulse train 112 with different pulse signatures, e.g., pulse wavelength or pulse polarization. Each pulse in a sequence of pulses is assigned a pulse signature different from adjacent pulses or any other pulses in the sequence. The pulse separation module 130 separates these pulses according to the signatures to produce different pulse trains as the parallel optical channels.

Since each separated optical pulse train has a reduced repetition rate of $f_s/N$, each parallel electronic channel 140 can operate at this reduced rate $f_{electronic}=f_s/N$ rather than the high rate $f_s$. Each electronic channel may include an analog-to-digital converter ("ADC") so that the analog information in the modulated optical pulse train 122 is converted into digital form by N parallel ADCs. For given $f_{electronic}$ and $f_s$, the number N may be adjusted to match the total processing rate of parallel electronic channels and the optical sampling rate of the optical pulse train 122: $f_{electronic}=f_s/N$. An improvement of the processing speed by a factor of N can therefore be achieved over the state-of-art electronic devices.

For many practical applications, N may be chosen between 10 and 100. Hence, for $f_{electronic}$=10 GHZ and N=10, a sampling rate of $f_s$=100 GHZ can be achieved by using the system 100.

Figure 2:
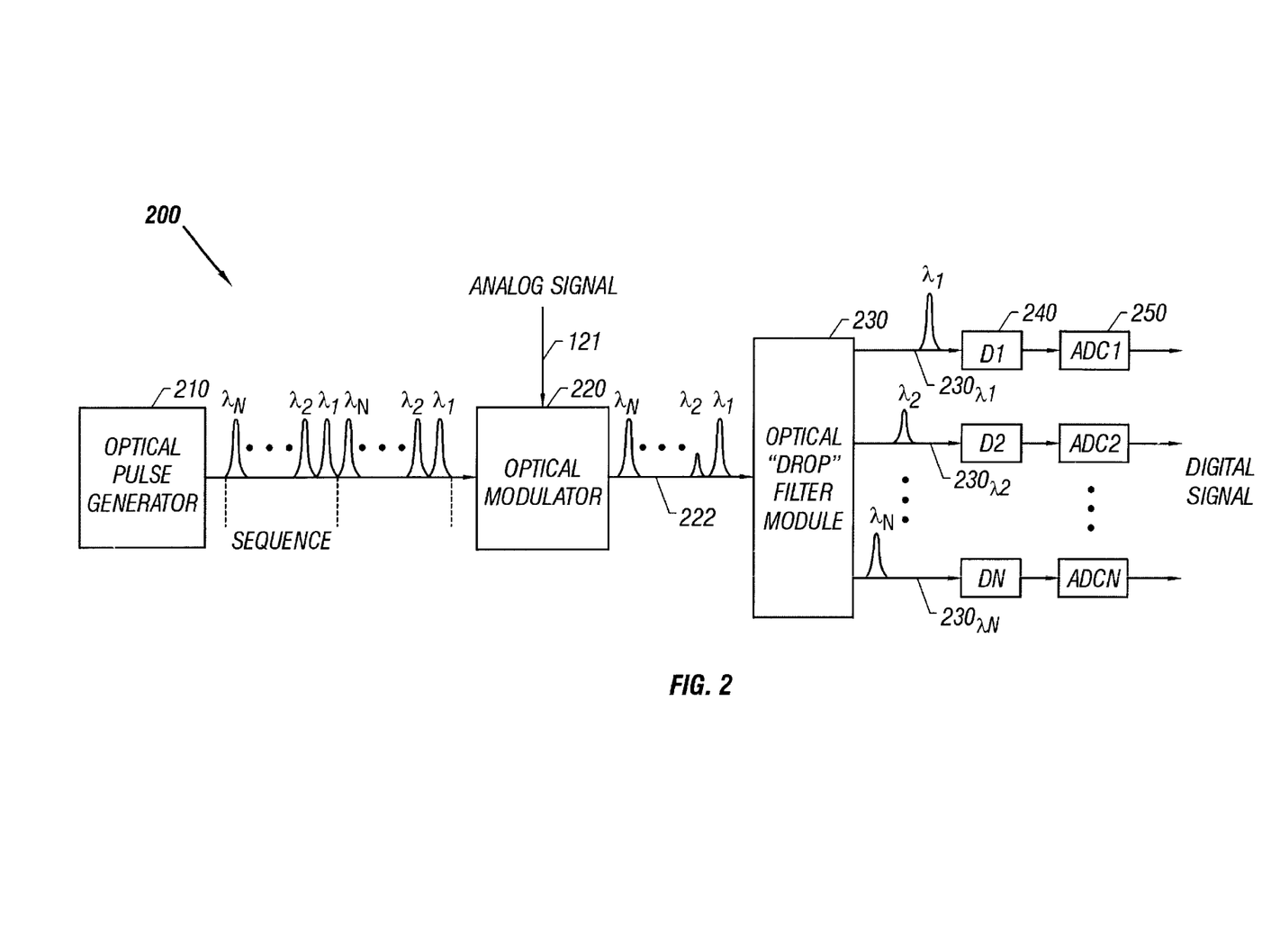
FIG. 2 shows one implementation of the device of FIG. 1.

FIG. 2 shows one implementation 200 of the system 100 in FIG. 1. Certain aspects of this system is disclosed by Yariv and Koumans in "Time interleaved optical sampling for ultra-high speed A/D conversion," Electronic Letters, vol. 34 (21) pp.2012–2013 (1998), which is incorporated herein by reference. An optical pulse generator 210 is configured to produce an optical pulse train 212 with sequentially repetitive sets of pulses where each set includes N sequential pulses centered at different wavelengths $\lambda_1, \lambda_2, \ldots, \lambda_N$ at a repetition rate $f_s$. An optical amplitude modulator 220 modulates the amplitudes of the pulses in the pulse train 212 to produce an amplitude-modulated pulse train 222. Hence, the amplitude variation in the pulse train 222 represents the information in the analog signal 121.

The optical pulse separation module 130 in the FIG. 1 is implemented by using an optical filter module 230 to separate the pulses in the pulse train 222 according to their wavelengths into N different pulse trains $230\lambda_1$, $230\lambda_2$, $230\lambda_3, \ldots,$ and $230\lambda_N$. Each pulse train $230\lambda_i$(i=1, 2, ... N) has pulses only of the wavelength $\lambda_i$ and at a reduced common repetition rate of $f_s$/N. N parallel electronic channels, each including an optical detector 240 and an ADC, converts the analog samples in the N different pulse trains $230\lambda_1, 230\lambda_2, 230\lambda_3, \ldots,$ and $230\lambda_N$ into digital data.

Figure 3A:
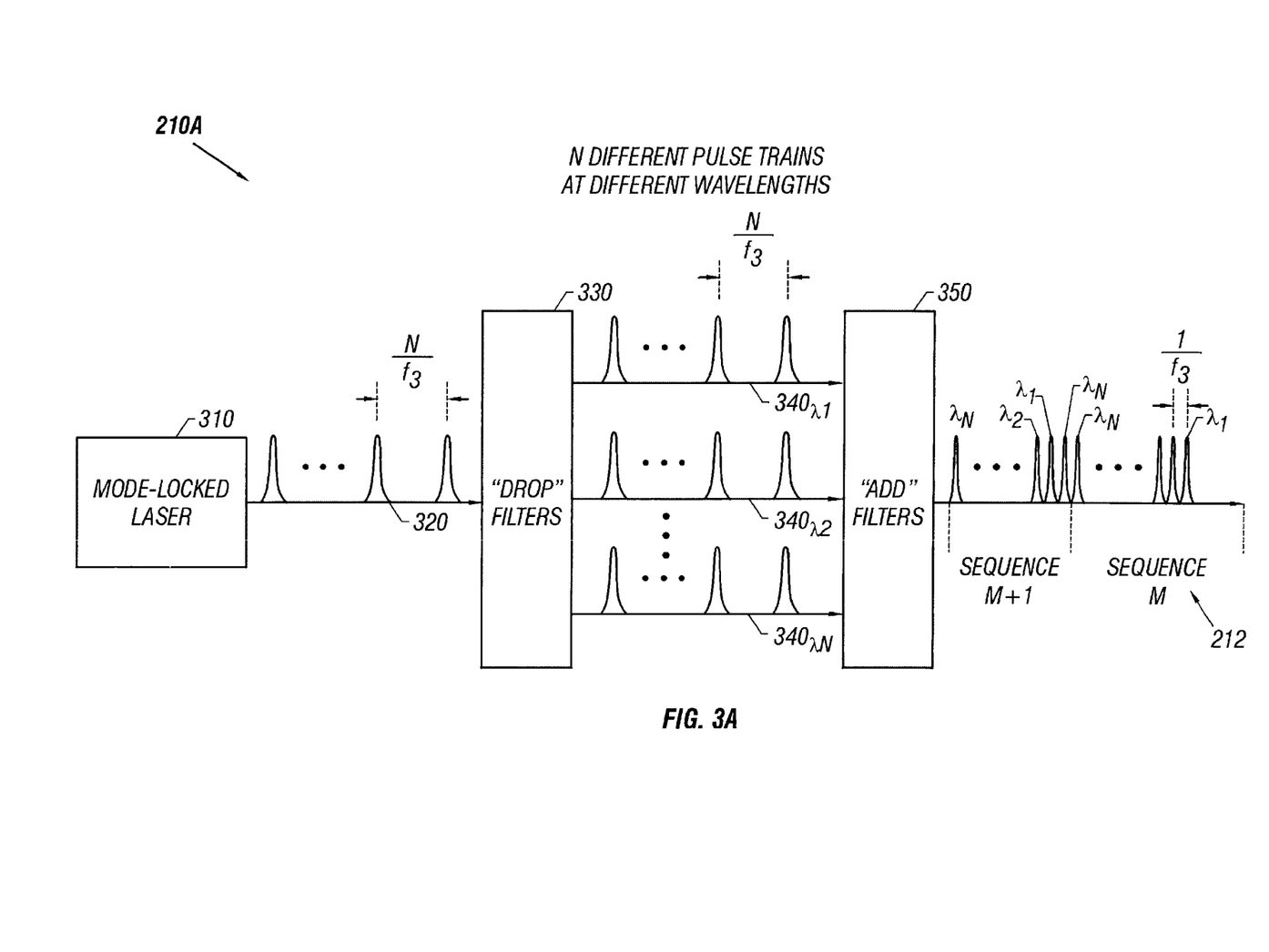
FIGS. 3A, 3B, 3C, and 3D show one embodiment of a pulse generator used in the device of FIG. 2.

The optical pulse generator 210 may be formed of a mode-locked laser 310, a set of demultiplexers 330 such as "drop" filters connected in series, and a set of optical multiplexers 350 such as "add" filters connected in series as shown in FIG. 3A. Many optical add and drop filters may be used. See, for example, Kewitsch et al., "All-fiber zero-insertion-loss add-drop filter for wavelength-division multiplexing," Optics Letters, Vol. 23 (2), pp. 106–108 (1998) and Agrawal, "Fiber-optic communication systems", 2nd edition, Chapter 7, John Wiley & Sons, New York (1997), which are incorporated herein by reference.

Figure 3B:
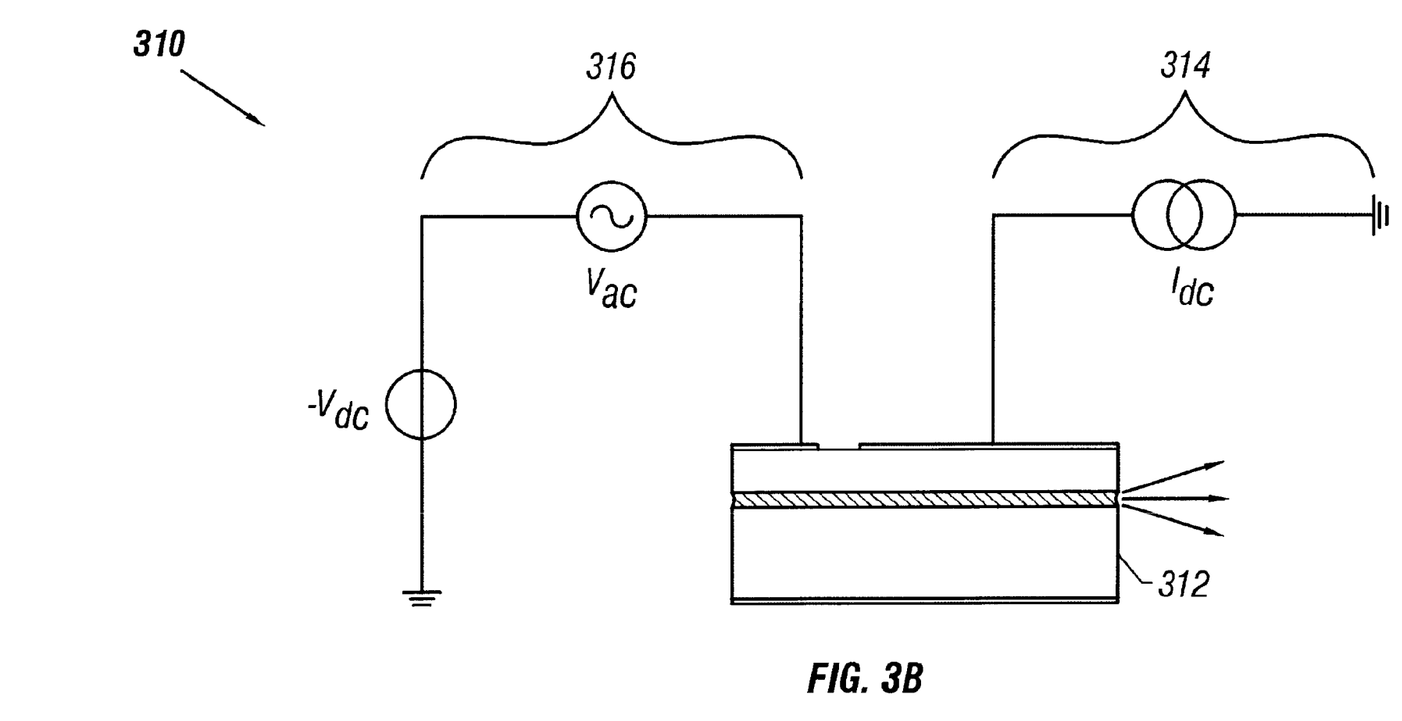

The mode-locked layer 310 is preferably actively mode-locked by using an external electronic oscillator at an oscillation frequency $f_{osc}=f_s/N$. Both $f_{osc}$ and N may be adjusted so as to achieve a desired $f_s$. One example of the mode-locked laser is shown in FIG. 3B where an edge-emitting semiconductor laser 312 is driven by a current source 314 and is mode-locked by a mode-locking oscillator 316. Other mode-locked lasers may also be used, including other types of semiconductor lasers and fiber lasers.

The laser output from the laser 310 is a pulse train 320 with a repetition rate of $f_s$/N. Each pulse includes spectral components of different wavelengths emitted by the laser medium. Hence, the pulse train 320 can be filtered to produce one or more optical trains centered at desired wavelengths selected from the spectral components in the laser output. The drop filters 330 are specifically designed to achieve this filtering.

Figure 3C:
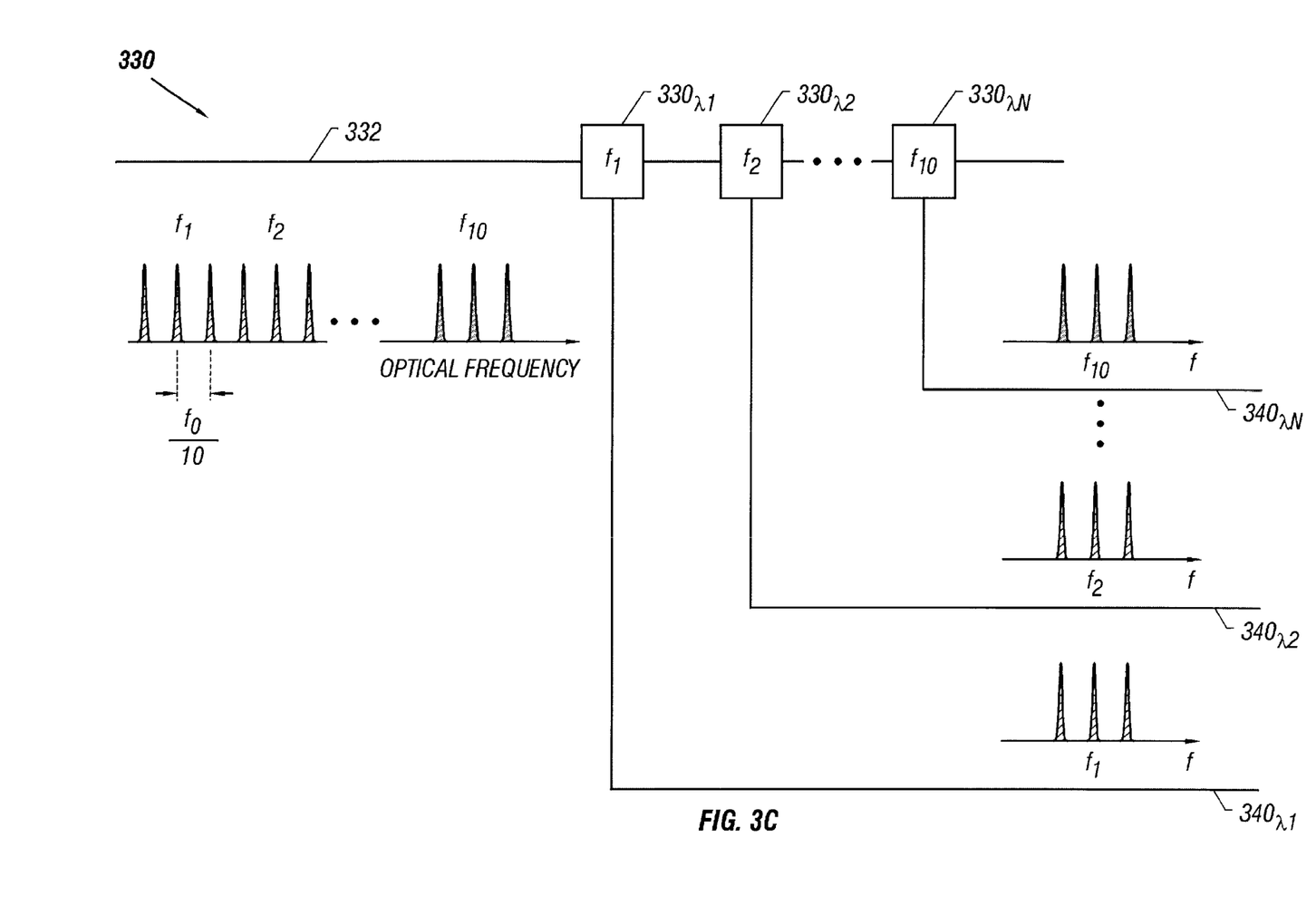

Referring to FIG. 3C, N drop filters $330\lambda_1, 230\lambda_2, \ldots$, and $330\lambda_N$ at different wavelengths $\lambda_1, \lambda_2, \ldots,$ and XN are connected in series in a fiber 332 to form an optical path that receives the optical pulse train 320 from the laser 310. Each drop filter is configured to select a spectral component at a wavelength $\lambda_i$ (i=1, 2, ..., N) to produce an output and transmits the remaining spectral components down the fiber 332. Hence, the selected output $340\lambda_i$ from a drop filter $330\lambda_i$ is a pulse train 5 centered at the wavelength $\lambda_i$ and has the same pulse repetition rate $f_s$/N as the unfiltered pulse train 320. Since the spectral components at wavelengths other than $\lambda_i$ are eliminated, the pulse width of the selected output $340\lambda_i$ is broadened compared to the pulse width of the unfiltered pulse train 320.

Figure 3D:
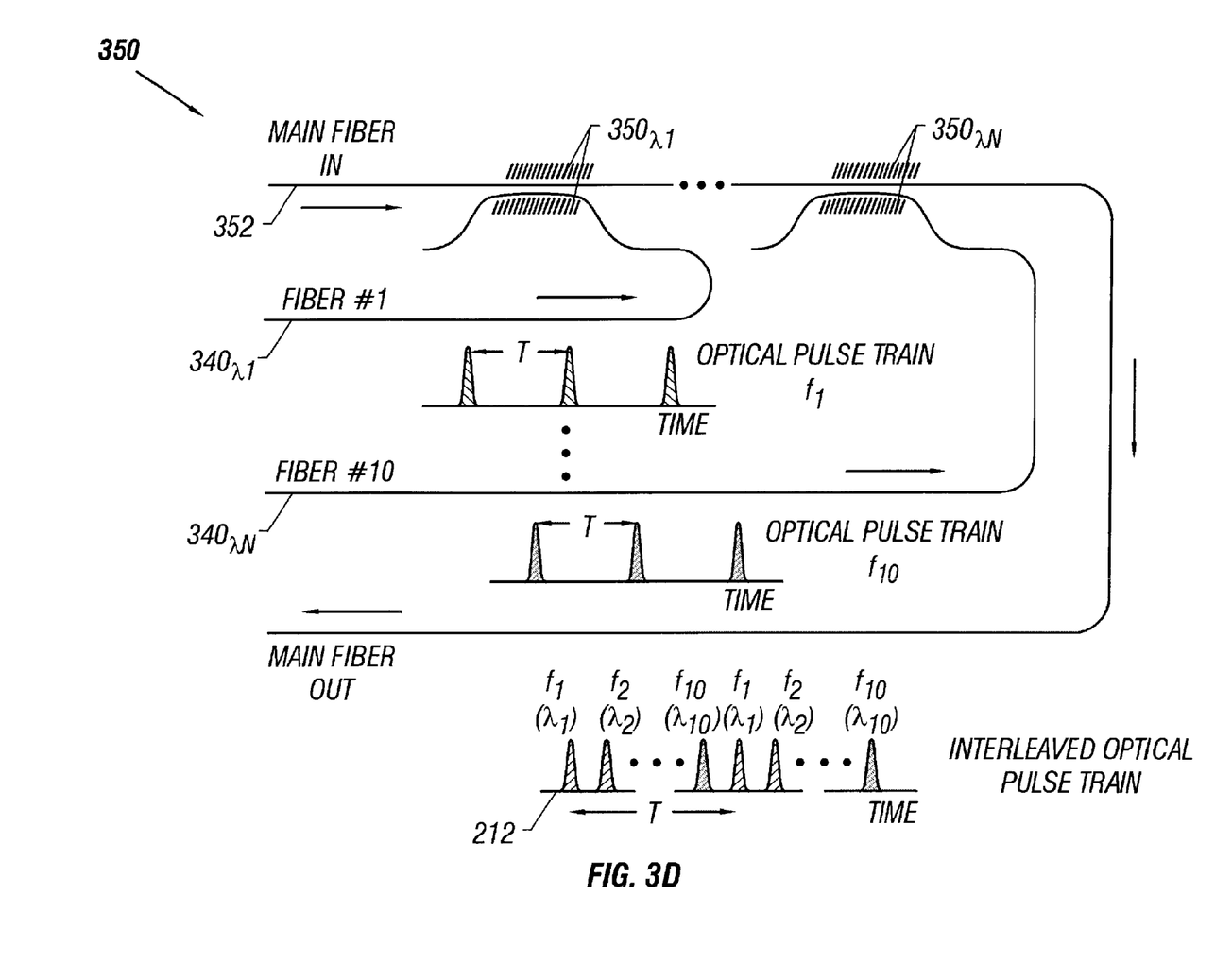

The add filters 350 are designed to interleave pulse trains $330\lambda_1, 330\lambda_2, \ldots,$ and $330\lambda_N$ to form a dense pulse train 212 with a repetition rate of $f_s$. One implementation is illustrated in FIG. 3D. N add filters $350\lambda_1, 350\lambda_2, \ldots,$ and $350\lambda_N$ are connected in series in a fiber 352. Each add filter $350\lambda_i$ (i=1, 2, ..., N) is connected to receive a respective output $340\lambda_i$ from the drop filter $330\lambda_i$ and add the output $340\lambda_i$ to the fiber 352. A constant temporal delay is introduced (by using an fiber delay line or other optical delay element) to each add filter $350\lambda_i$ so that the outputs $340\lambda_1$, $340\lambda_2, \ldots,$ and $340\lambda_N$ are sequentially added to the fiber 352 and the temporal separation between the first output $340\lambda_1$ and the last output $340\lambda_N$ is equal to the pulse separation produced by the laser 310.

Thus, the newly generated pulse 212 in the fiber 252 is a special pulse train of a repetitive pulse sequence which is sequentially formed of N pulses of different wavelengths. In every period of $1/f_s$, a pulse at a different wavelength arrives. In a period of $T=(N-1)/Nf_s$, the spectral pattern of the pulses repeats, i.e., the wavelength of a pulse repeats after every N pulses. This pulse train has the unique property that the wavelength of each pulse in the train is different from those of its neighbors in a controlled fashion. The pulses are essentially identical in shape and equally spaced in time.

Figure 4:
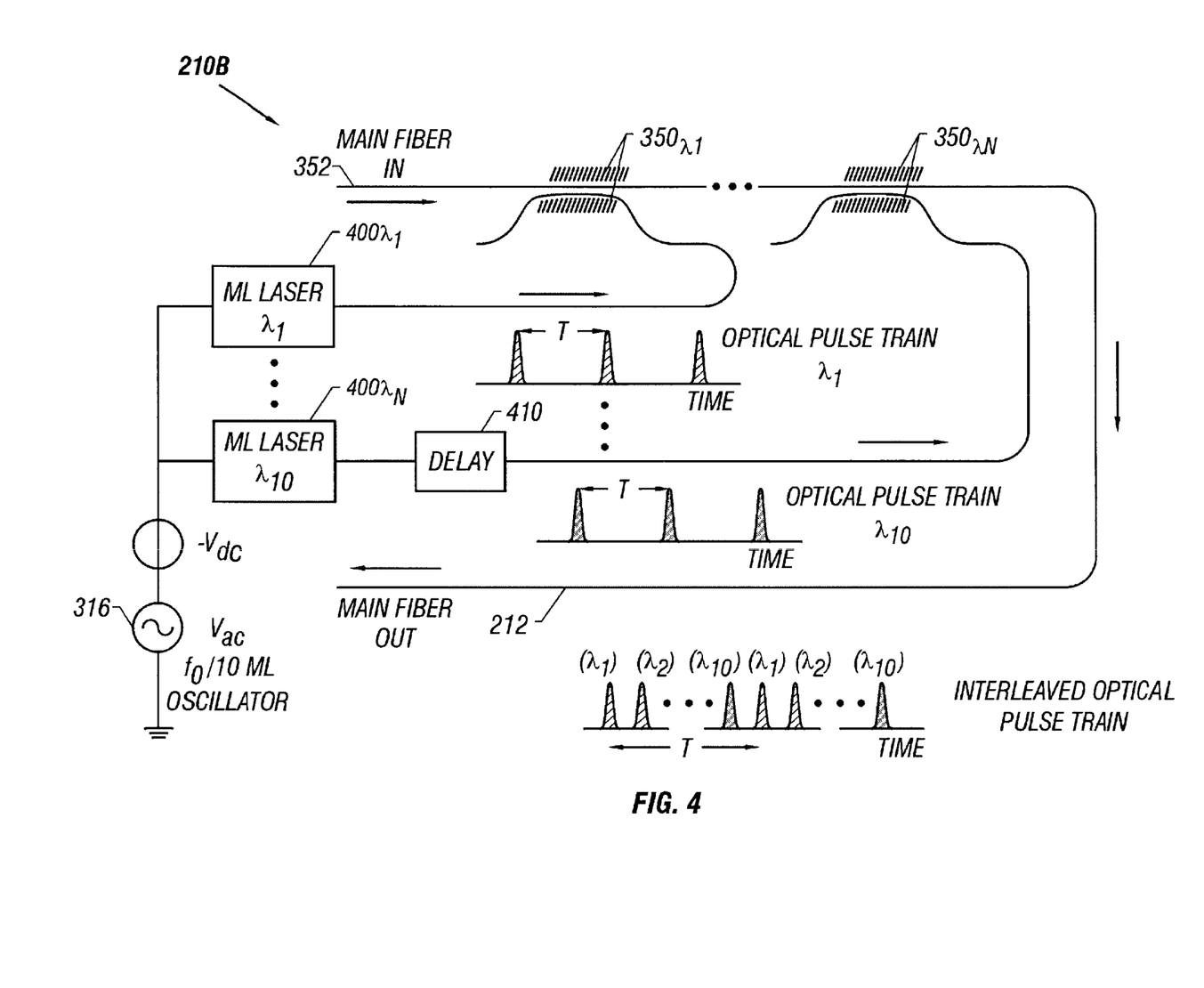
FIG. 4 shows an alternative embodiment of a pulse generator used in the device of FIG. 2.

FIG. 4 shows another alternative implementation 210B of the pulse generator 210 in FIG. 2. N different mode-locked lasers $400\lambda_1, 400\lambda_2, \ldots,$ and $400\lambda_N$ are used to generate N pulse trains of the same repetition rate at $f_s$/N but at different wavelengths $\lambda_1, \lambda_2, \ldots,$ and $\lambda_N$. The mode-locked lasers $400\lambda_1, 400\lambda_2, \ldots,$ and $400\lambda_N$ are mode-locked by a common mode-locking oscillator 316. The outputs of the lasers are then interleaved in a fiber 352 to form the dense pulse train. The output of each laser is properly delayed by using a delay element 410. The multilayers can be integrated monolithically to be compact and the delay between pulses of different wavelengths may also be electronically controlled by phase delays of RF drivers to the individual lasers.

Figure 5:
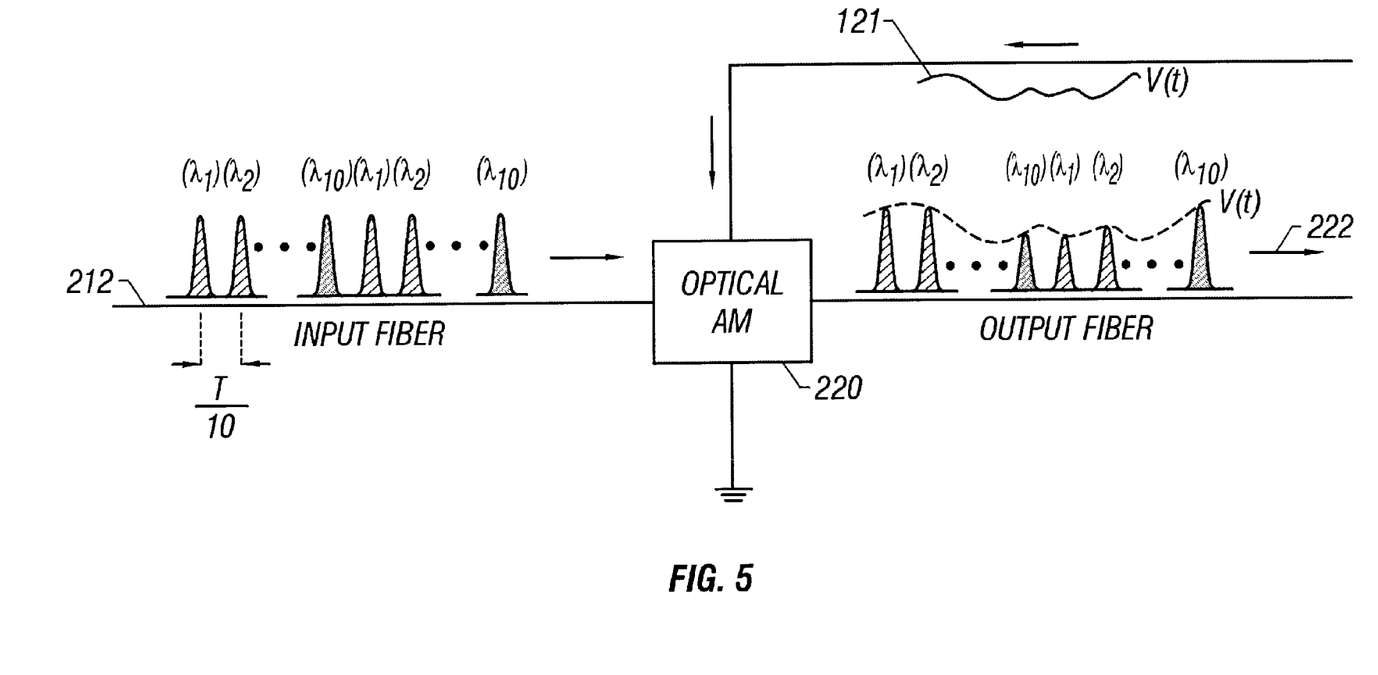
FIG. 5 illustrates amplitude modulation on optical pulses to sample an analog signal based on operation of an optical modulator.

The optical amplitude modulator 220 in FIG. 2 modulates the amplitude of each pulse in the dense time-wavelength interleaved pulse train 212 to obtain samples of an analog signal 121 v(t) (e.g., a rf signal). The sampling frequency is $f_s$, the pulse repetition rate. The analog signal 121 is applied as a voltage (or current) to the modulator 220 such that the instantaneous transmitted optical intensity is proportional to v(t) or some representation of v(t). This is illustrated in FIG. 5.

Since each pulse undergoes a multiplication by the optical modulator 220 by a factor kv(t) where k is a constant of the modulator 220. The result is a sampling of the signal by the optical pulses. The variation of v(t) during the passage of an individual pulse is assumed to be negligible.

The modulated pulse train 222 from the modulator 220 has a repetition rate $f_s$ which may be fast for conventional electronics to process. One aspect of the invention is to separate the pulse train 222 into N pulse trains of a reduced pulse rate so that N optical detectors 240 can be used to convert the pulses into N parallel electronic channels and therefore to process the data in parallel.

Figure 6A:
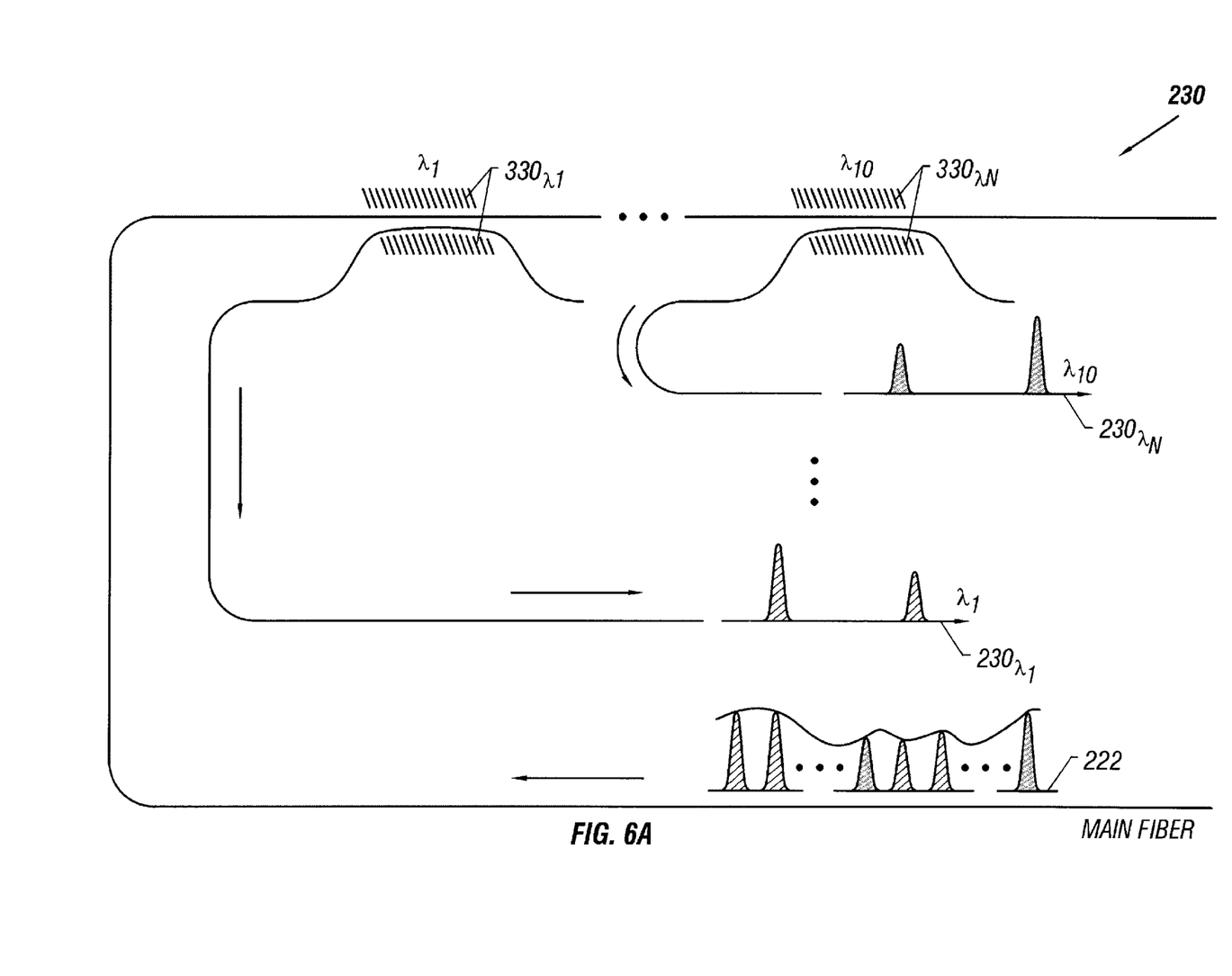
FIG. 6A shows one embodiment of a drop filter module for separating time-wavelength interleaved pulses.
Figure 6B:
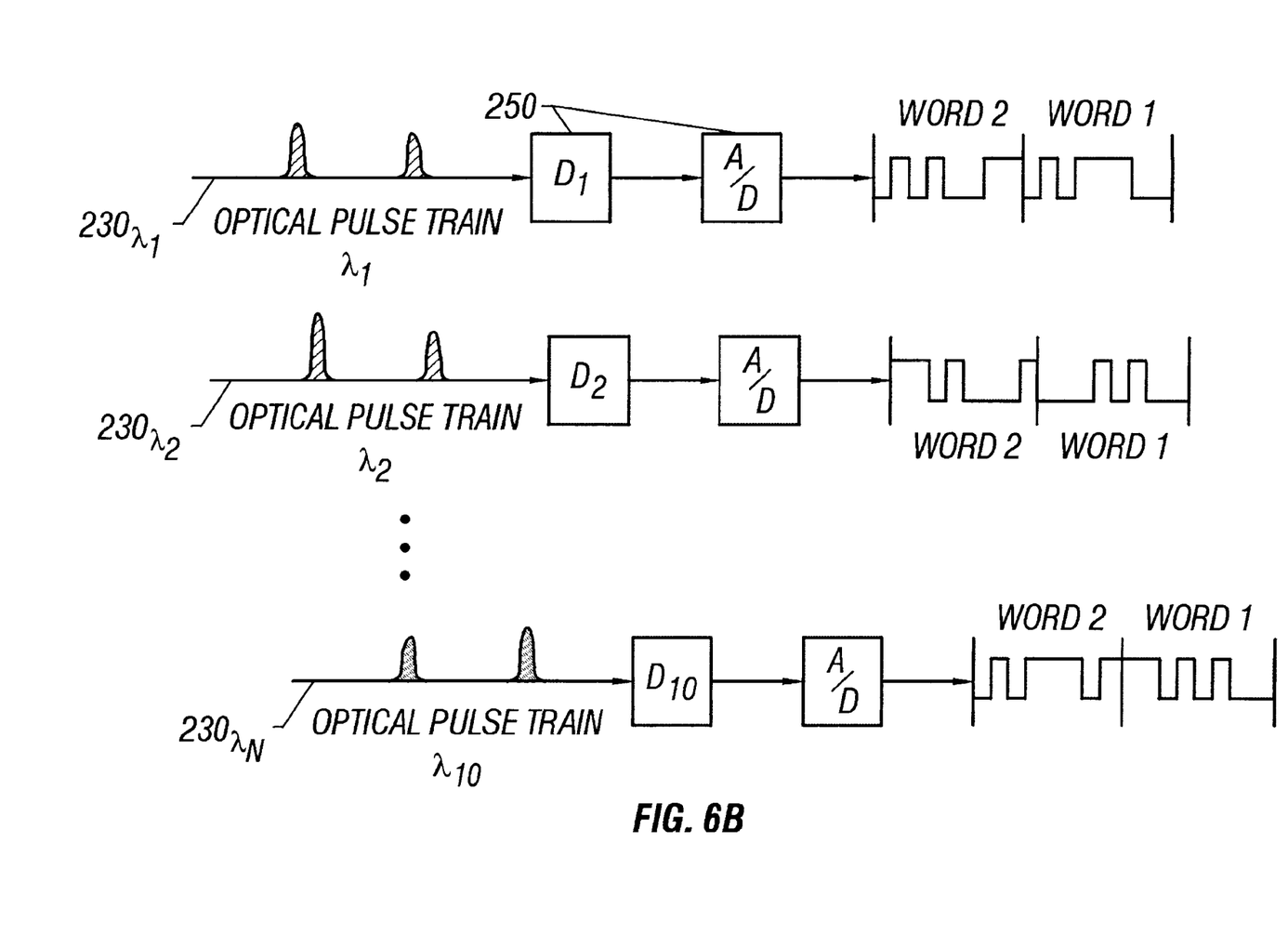
FIG. 6B illustrates operation of the analog-to-digital conversion by parallel electronic channels.

FIG. 6A shows one embodiment of the drop filter module 230 for separating the dense pulse train 222. The construction is similar to the device shown in FIG. 3C used in the pulse generator shown in FIG. 3A. The modulated pulses centered at a common wavelength $\lambda_i$ (i=1, 2, . . . , N) are selected out by a drop filter at that wavelength $\lambda_i$ to form a new modulated pulse train $230\lambda_i$ with a reduced pulse repetition rate at $f_s/N$, since the spectral pattern of the pulses repeats every N pulses in the pulse train 222. N modulated pulse trains are generated among which the information of the analog signal 121 are distributed. The pulse trains are further converted into N electronic channels of digital data as shown by FIG. 6B.

Although the present invention has been described in detail with reference to the preferred embodiments, various modifications and variations may be possible without departing from the spirit of the invention. For example, pulse trains with different wavelengths can also be generated in other ways using a single laser, for example, by spectral slicing. See, Knuss et al., "Scalable 32 channel chirped-pulse WDM source," Electronic Letters, vol. 32 (14), pp.1311–1312 (1996). Other mode-locked lasers can also be used to generate the dense pulse trains such as lasers disclosed by Sanders et al. in "Timing jitter and pulse energy fluctuations in a passively mode-locked 2-section quantum-well laser coupled to an external cavity," Applied Physics Letters, Vol.59(11), pp.1275–1277 (1991), by Arahira et al. in "Transform-limited optical short-pulse generation at high repetition rate over 40 GHz from a monolithic passively mode-locked DBR laser diode," IEEE Photonics Technology Letters, Vol. 5 (12), pp.1362–1365 (1993), and by Salvatore et al. in "Wavelength tunable source of subpicosecond pulses from CW passively mode-locked 2-section multiple-quantum-well laser," IEEE Photonic Technology Letters, vol. 5 (7), pp.756–758 (1993). Each disclosure of the above references is incorporated herein by reference.

These and other variations and modifications are intended to be encompassed by the following claims.

What is claimed is:

1. A device, comprising:
   an optical pulse generator configured to produce a sampling optical pulse train with a temporally repetitive sequence of optical pulses at a sampling pulse repetition rate, wherein optical pulses in each sequence have pulse signatures different from one another; and
   an optical modulator disposed to receive said sampling optical pulse train and configured to modulate a selected property of said optical pulses, in response to an analog signal, to produce a modulated optical pulse train with modulated optical pulses at said sampling repetition pulse rate to carry information in said analog signal.

2. The device as in claim 1, wherein said pulse signatures include optical wavelengths of said optical pulses.

3. The device as in claim 1, wherein said pulse signatures include states of polarization of said optical pulses.

4. The device as in claim 1, wherein said selected property of said optical pulses includes an amplitude of each optical pulse and wherein said optical modulator includes an amplitude modulator.

5. The device as in claim 1, wherein said selected property of said optical pulses includes a phase of each optical pulse and wherein said optical modulator includes a phase modulator.

6. The device as in claim 1, wherein said optical modulator includes an electro-optical modulator.

7. The device as in claim 1, wherein said optical pulse generator includes at least one mode-locked laser that locks laser modes according to an oscillator.

8. The device as in claim 1, further comprising a pulse separation module disposed to receive said modulated pulse train from said optical modulator and configured to separate said modulated pulse train into N pulse trains where N is an integer greater than 1, wherein each of said N pulse trains has a repetition pulse rate less than said sampling pulse repetition rate by a factor of N and is centered at a different wavelength.

9. The device as in claim 8, further comprising N electronic channels connected in parallel with respect to one another, wherein each electronic channel is connected to receive one of said N pulse trains from said pulse separation module and to electrical signals.

10. The device as in claim 9, wherein each electronic channel includes an optical detector to receive a respective pulse train and an analog-to-digital converter coupled to convert a detector output from said optical detector into a digital form.

11. The device as in claim 9, wherein said sampling pulse repetition rate is higher than a response speed of each electronic channel and said repetition pulse rate of each of said N pulse trains is not greater than said response speed of each electronic channel.

12. The device as in claim 1, wherein said analog signal is an optical signal.

13. The device as in claim 1, wherein said analog signal is an electrical signal.

14. The device as in claim 1, wherein a wavelength of each optical pulse in each sequence is different from wavelengths of any other optical pulses in said each sequence, and wherein said pulse generator includes:
   a mode-locked laser producing optical pulses in response to an external oscillator that oscillates at a frequency less than said sampling pulse repetition rate;
   a plurality of drop filters connected relative to one another in series to filter said optical pulses from said mode-locked laser to produce a plurality of pulse trains centered at different wavelengths; and
   a plurality of add filters connected relative to one another in series to respectively receive said pulse trains from said drop filters, said add filters operable to interleave pulses of different wavelengths from said pulse trains to produce said sampling optical pulse train.

15. The device as in claim 1, wherein a wavelength of each optical pulse in each sequence is different from wavelengths of any other optical pulses in said each sequence, and wherein said pulse generator includes:
   a plurality of mode-locked lasers operating to produce pulse trains at different wavelengths based a mode-lock operation according to a common oscillator at said sampling pulse repetition rate; and
   a plurality of add filters connected relative to one another in series to respectively receive said pulse trains from said mode-locked lasers, said add filters operable to interleave pulses of different wavelengths from said pulse trains to produce said sampling optical pulse train.

16. The device as in claim 15, further comprising an optical delay element between each mode-locked laser and a respective add filter to produce a proper delay for said interleaving pulses of different wavelengths.

17. A method, comprising:
   causing a sampling optical pulse train with a temporally repetitive sequence of optical pulses to be generated at a sampling pulse repetition rate, wherein optical pulses in each sequence have pulse signatures different from one another; and causing a selected property of said optical pulses in said sampling optical pulse train to be modulated according to a signal variation in an analog signal to produce a modulated optical pulse train at said sampling pulse repetition rate so that optical pulses in said modulated optical pulse train are samples of the analog signal.

18. The method as in claim 17, wherein said pulse signatures include optical wavelengths of said optical pulses.

19. The method as in claim 17, wherein said pulse signatures include states of polarization of said optical pulses.

20. The method as in claim 17, wherein said selected property of said optical pulses includes an amplitude of each optical pulse.

21. The method as in claim 17, wherein said selected property of said optical pulses includes a phase of each optical pulse.

22. The method as in claim 17, further comprising causing said modulated optical pulse train to be separated into a plurality of optical pulse trains which are centered at different wavelengths and have a pulse repetition rate less than said sampling pulse repetition rate.

23. The method as in claim 22, further comprising:
   causing each optical pulse train to be converted into a train of electronic pulses; and
   causing said train of electronic pulses to be converted into a digital form to represent information in the analog signal.

* * * * *